United States Patent
Izen et al.

(10) Patent No.: US 11,119,913 B2
(45) Date of Patent: Sep. 14, 2021

(54) SELECTIVE USE OF GARBAGE COLLECTION DURING EXPANSION OF GEOMETRY ADDRESSABLE REGIONS OF A REDUNDANT ARRAY OF INDEPENDENT DRIVE (RAID) CONFIGURATION

(71) Applicant: International Business Machines Corporation, Armonk, NY (US)

(72) Inventors: Gemma Izen, Winchester (GB); Alastair Cooper, Winchester (GB); Nicholas Michael O'Rourke, Southampton (GB); Dominic Tomkins, Hook (GB)

(73) Assignee: International Business Machines Corporation, Armonk, NY (US)

( * ) Notice: Subject to any disclaimer, the term of this patent is extended or adjusted under 35 U.S.C. 154(b) by 30 days.

(21) Appl. No.: 16/789,315

(22) Filed: Feb. 12, 2020

(65) Prior Publication Data
US 2021/0248068 A1   Aug. 12, 2021

(51) Int. Cl.
*G06F 12/02*   (2006.01)
*G06F 3/06*   (2006.01)

(52) U.S. Cl.
CPC ........ *G06F 12/0253* (2013.01); *G06F 3/0604* (2013.01); *G06F 3/0644* (2013.01); *G06F 3/0689* (2013.01); *G06F 2212/1044* (2013.01)

(58) Field of Classification Search
CPC .. G06F 12/0253; G06F 3/0604; G06F 3/0644; G06F 3/0689
See application file for complete search history.

(56) References Cited

U.S. PATENT DOCUMENTS

| | | | |
|---|---|---|---|
| 8,527,544 B1 | 9/2013 | Colgrove et al. | |
| 8,949,692 B1* | 2/2015 | Bonwick | G06F 3/0604 714/766 |
| 9,817,717 B2 | 11/2017 | Lee | |
| 10,203,903 B2* | 2/2019 | Feigin | G06F 3/0688 |
| 2012/0036309 A1* | 2/2012 | Dillow | G06F 3/0688 711/103 |
| 2012/0084504 A1* | 4/2012 | Colgrove | G06F 3/0632 711/114 |
| 2015/0205667 A1* | 7/2015 | Bonwick | G06F 11/1076 714/6.24 |
| 2016/0188410 A1* | 6/2016 | Lee | G06F 11/1044 714/6.24 |
| 2020/0125447 A1* | 4/2020 | Hosmani | G06F 3/0652 |

* cited by examiner

*Primary Examiner* — Ryan Bertram
(74) *Attorney, Agent, or Firm* — Zilka-Kotab, P.C.

(57) ABSTRACT

A computer-implemented method for performing garbage collection in a data storage system having a RAID configuration according to one embodiment includes determining on which geometry addressable region of the RAID configuration extents of data are stored. The RAID configuration includes an old geometry addressable region and a new geometry addressable region. The method further includes determining an order for performing garbage collection on the extents of data. Extents of data determined to be stored on the old geometry addressable region are assigned a higher priority within the order than extents of data determined to be stored on the new geometry addressable region. Moreover, the method includes performing garbage collection on the data storage system according to the order for performing garbage collection.

20 Claims, 7 Drawing Sheets

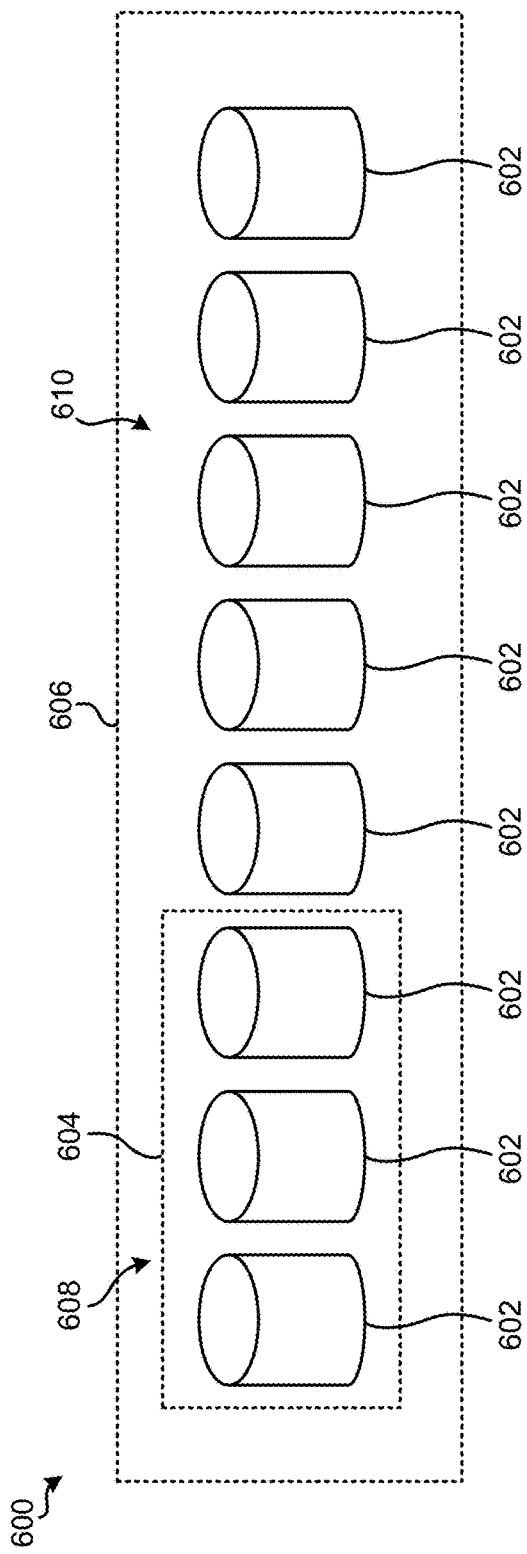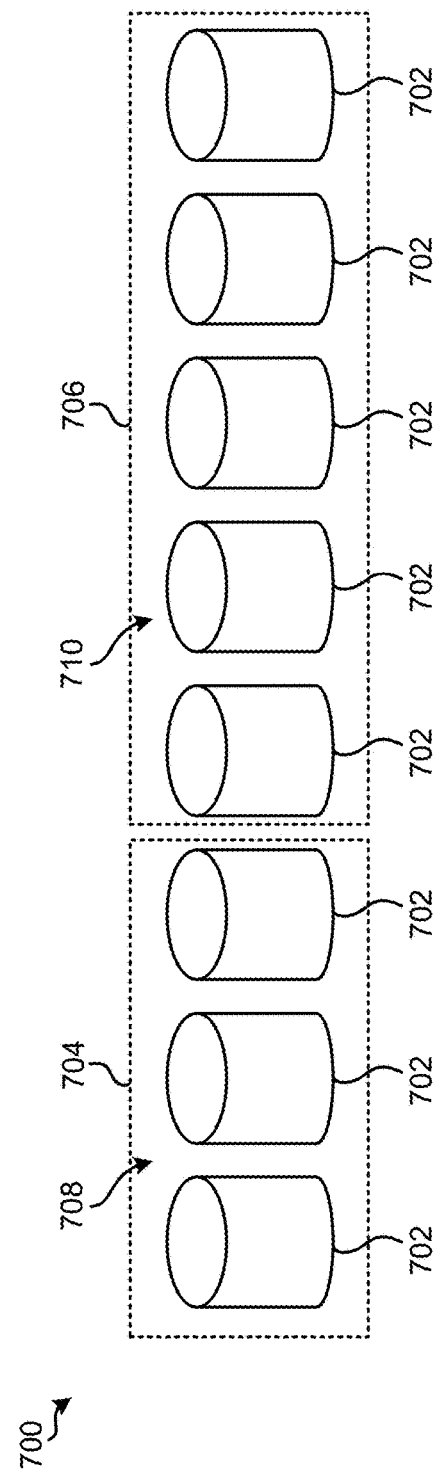

SELECTIVE USE OF GARBAGE COLLECTION DURING EXPANSION OF GEOMETRY ADDRESSABLE REGIONS OF A REDUNDANT ARRAY OF INDEPENDENT DRIVE (RAID) CONFIGURATION

BACKGROUND

The present invention relates to data storage systems, and more specifically, this invention relates to garbage collection performed on geometry addressable regions of a RAID configuration.

RAID involves a data storage virtualization technology which combines multiple physical data storage (e.g., memory) components into one or more logical units. Storing data in these logical units typically involves distributing or "striping" the data across the different physical data storage components. In doing so, the one or more logical units are able to improve data redundancy and/or overall performance in comparison to traditional data storage schemes.

Data is distributed across the different physical data storage components in a RAID configuration using one of several schemes, which are also referred to as "RAID levels". Each of the RAID levels are typically referred to using the word "RAID" followed by a number, such as RAID 0 or RAID 1. Each scheme, or RAID level, provides a different data distribution layout which balances reliability, availability, performance, and capacity in different manners. For example, RAID levels greater than RAID 0 provide protection against unrecoverable sector read errors, as well as against failures of whole physical drives.

SUMMARY

A computer-implemented method for performing garbage collection in a data storage system having a RAID configuration according to one embodiment includes determining on which geometry addressable region of the RAID configuration extents of data are stored. The RAID configuration includes an old geometry addressable region and a new geometry addressable region. The new geometry addressable region exists subsequent to restriping occurring over a relatively larger RAID set of the RAID configuration, and the old geometry addressable region exists prior to restriping occurring over the relatively larger RAID set of the RAID configuration. The method further includes determining an order for performing garbage collection on the extents of data. Extents of data determined to be stored on the old geometry addressable region are assigned a higher priority within the order than extents of data determined to be stored on the new geometry addressable region. Moreover, the method includes performing garbage collection on the data storage system according to the order for performing garbage collection.

A computer program product for performing garbage collection in a data storage system having a RAID configuration according to another embodiment includes a computer readable storage medium having program instructions embodied therewith. The program instructions are readable and/or executable by a controller to cause the controller to determine, by the controller, on which geometry addressable region of a RAID configuration extents of data are stored. The RAID configuration includes an old geometry addressable region and a new geometry addressable region. The new geometry addressable region exists subsequent to restriping occurring over a relatively larger RAID set of the RAID configuration, and the old geometry addressable region exists prior to restriping occurring over the relatively larger RAID set of the RAID configuration. The program instructions are further readable and/or executable by the controller to cause the controller to determine, by the controller, an order for performing garbage collection on the extents of data. Extents of data determined to be stored on the old geometry addressable region are assigned a higher priority within the order than extents of data determined to be stored on the new geometry addressable region. Moreover, the program instructions are readable and/or executable by the controller to cause the controller to perform, by the controller, garbage collection on the data storage system according to the order for performing garbage collection.

A system according to another embodiment includes a data storage system having a RAID configuration with an old geometry addressable region and a new geometry addressable region. The new geometry addressable region exists subsequent restriping occurring over a relatively larger RAID set of the RAID configuration, and the old geometry addressable region exists prior to restriping occurring over the relatively larger RAID set of the RAID configuration. The system further includes a processor, and logic integrated with the processor, executable by the processor, or integrated with and executable by the processor. The logic is configured to determine on which geometry addressable region of the RAID configuration extents of data are stored. The logic is further configured to determine an order for performing garbage collection on the extents of data. Extents of data determined to be stored on the old geometry addressable region are assigned a higher priority within the order than extents of data determined to be stored on the new geometry addressable region. The logic is further configured to perform garbage collection on the data storage system according to the order for performing garbage collection.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 6 is a representative diagram of a RAID configuration, in accordance with one embodiment.

FIG. 7 is a representative diagram of a RAID configuration, in accordance with one embodiment.

DETAILED DESCRIPTION

Figure 1:
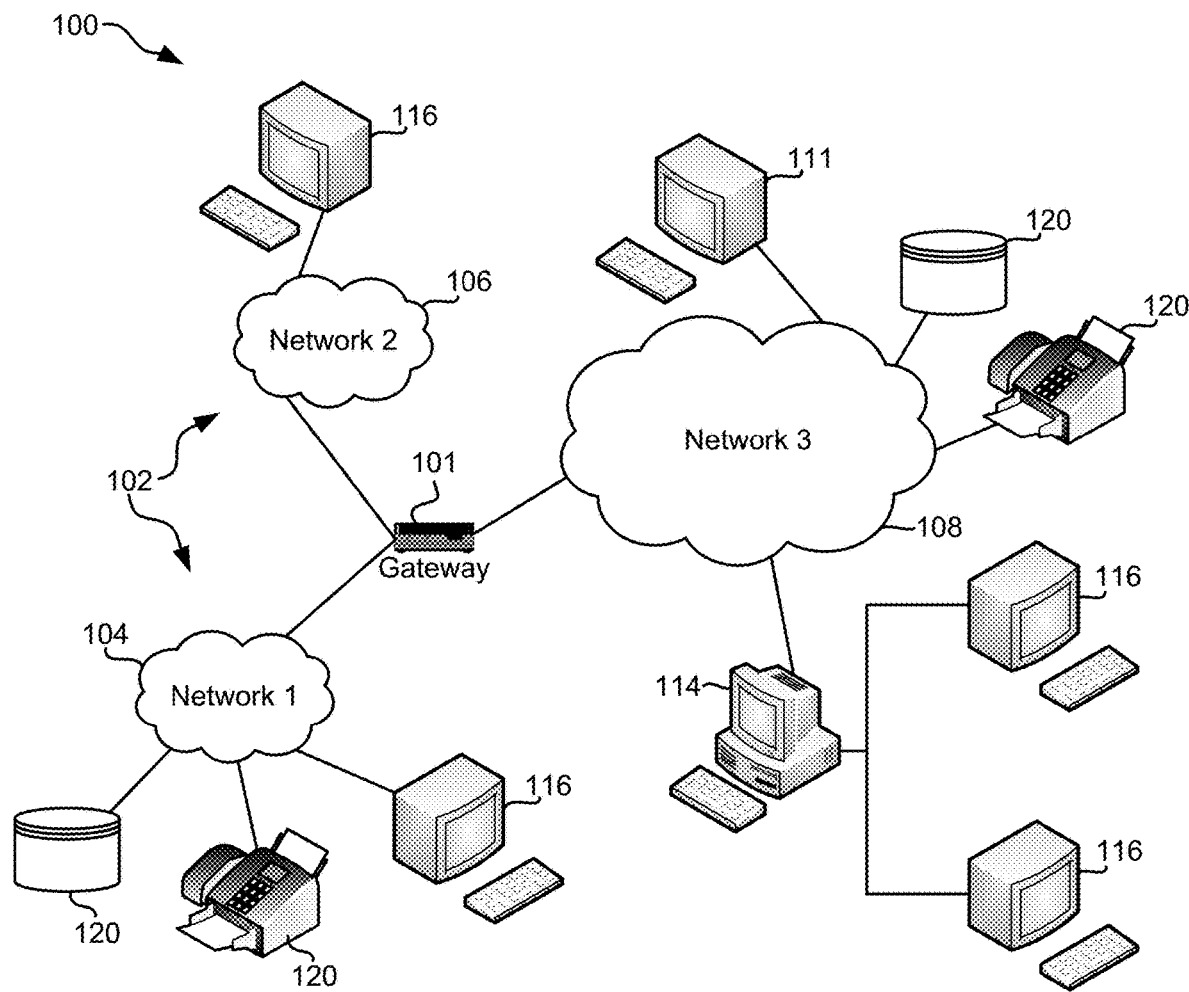
FIG. 1 is a depiction of a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for selective use of garbage collection to enable relatively efficient and quick RAID configuration expansion.

In one general embodiment, a computer-implemented method for performing garbage collection in a data storage system having a RAID configuration includes determining on which geometry addressable region of the RAID configuration extents of data are stored. The RAID configuration includes an old geometry addressable region and a new geometry addressable region. The new geometry addressable region exists subsequent restriping occurring over a relatively larger RAID set of the RAID configuration, and the old geometry addressable region exists prior to restriping occurring over the relatively larger RAID set of the RAID configuration. The method further includes determining an order for performing garbage collection on the extents of data. Extents of data determined to be stored on the old geometry addressable region are assigned a higher priority within the order than extents of data determined to be stored on the new geometry addressable region. Moreover, the method includes performing garbage collection on the data storage system according to the order for performing garbage collection.

In another general embodiment, a computer program product for performing garbage collection in a data storage system having a RAID configuration includes a computer readable storage medium having program instructions embodied therewith. The program instructions are readable and/or executable by a controller to cause the controller to determine, by the controller, on which geometry addressable region of a RAID configuration extents of data are stored. The RAID configuration includes an old geometry addressable region and a new geometry addressable region. The new geometry addressable region exists subsequent to restriping occurring over a relatively larger RAID set of the RAID configuration, and the old geometry addressable region exists prior to restriping occurring over the relatively larger RAID set of the RAID configuration. The program instructions are further readable and/or executable by the controller to cause the controller to determine, by the controller, an order for performing garbage collection on the extents of data. Extents of data determined to be stored on the old geometry addressable region are assigned a higher priority within the order than extents of data determined to be stored on the new geometry addressable region. Moreover, the program instructions are readable and/or executable by the controller to cause the controller to perform, by the controller, garbage collection on the data storage system according to the order for performing garbage collection.

In another general embodiment, a system includes a data storage system having a RAID configuration with an old geometry addressable region and a new geometry addressable region. The new geometry addressable region exists subsequent restriping occurring over a relatively larger RAID set of the RAID configuration, and the old geometry addressable region exists prior to restriping occurring over the relatively larger RAID set of the RAID configuration. The system further includes a processor, and logic integrated with the processor, executable by the processor, or integrated with and executable by the processor. The logic is configured to determine on which geometry addressable region of the RAID configuration extents of data are stored. The logic is further configured to determine an order for performing garbage collection on the extents of data. Extents of data determined to be stored on the old geometry addressable region are assigned a higher priority within the order than extents of data determined to be stored on the new geometry addressable region. The logic is further configured to perform garbage collection on the data storage system according to the order for performing garbage collection.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX® system which emulates an IBM® z/OS® environment, a UNIX® system which virtually hosts a Microsoft® Windows® environment, a Microsoft® Windows® system which emulates an IBM® z/OS® environment, etc. This virtualization and/or emulation may be enhanced through the use of VMware® software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
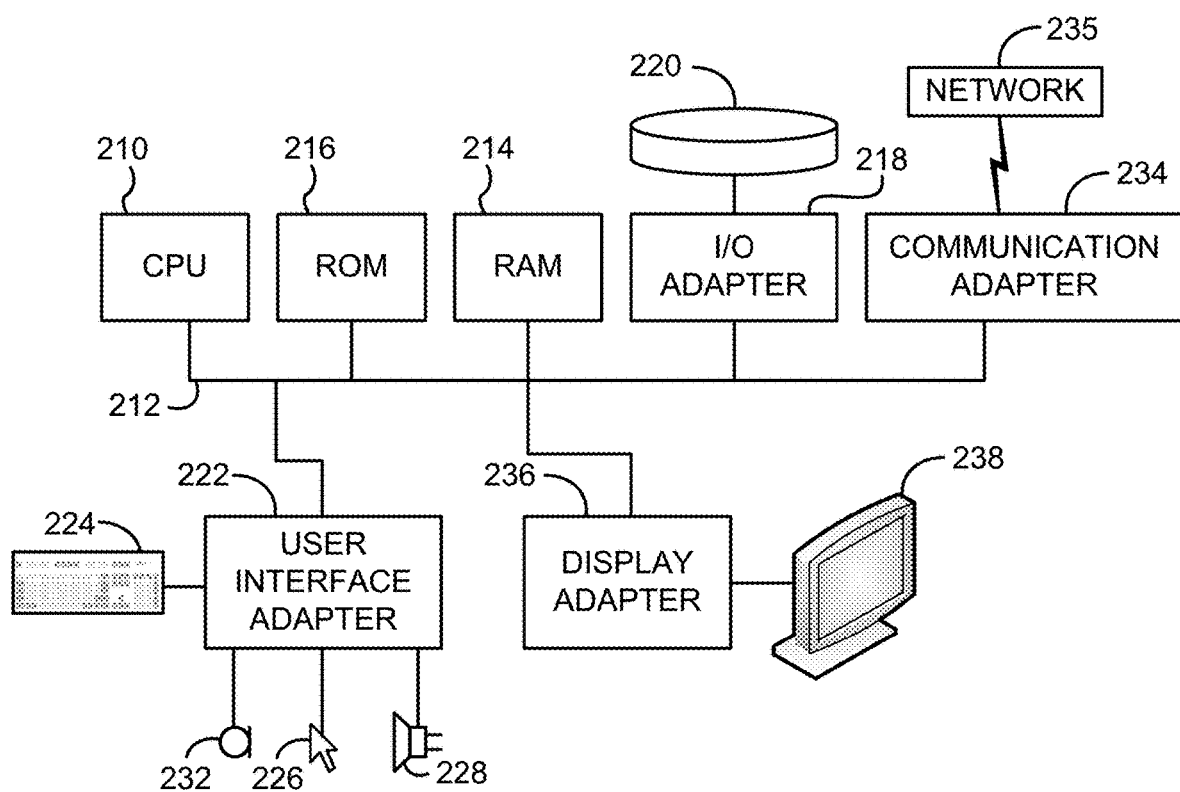
FIG. 2 is depiction of a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a macOS®, a UNIX® OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

Figure 3:
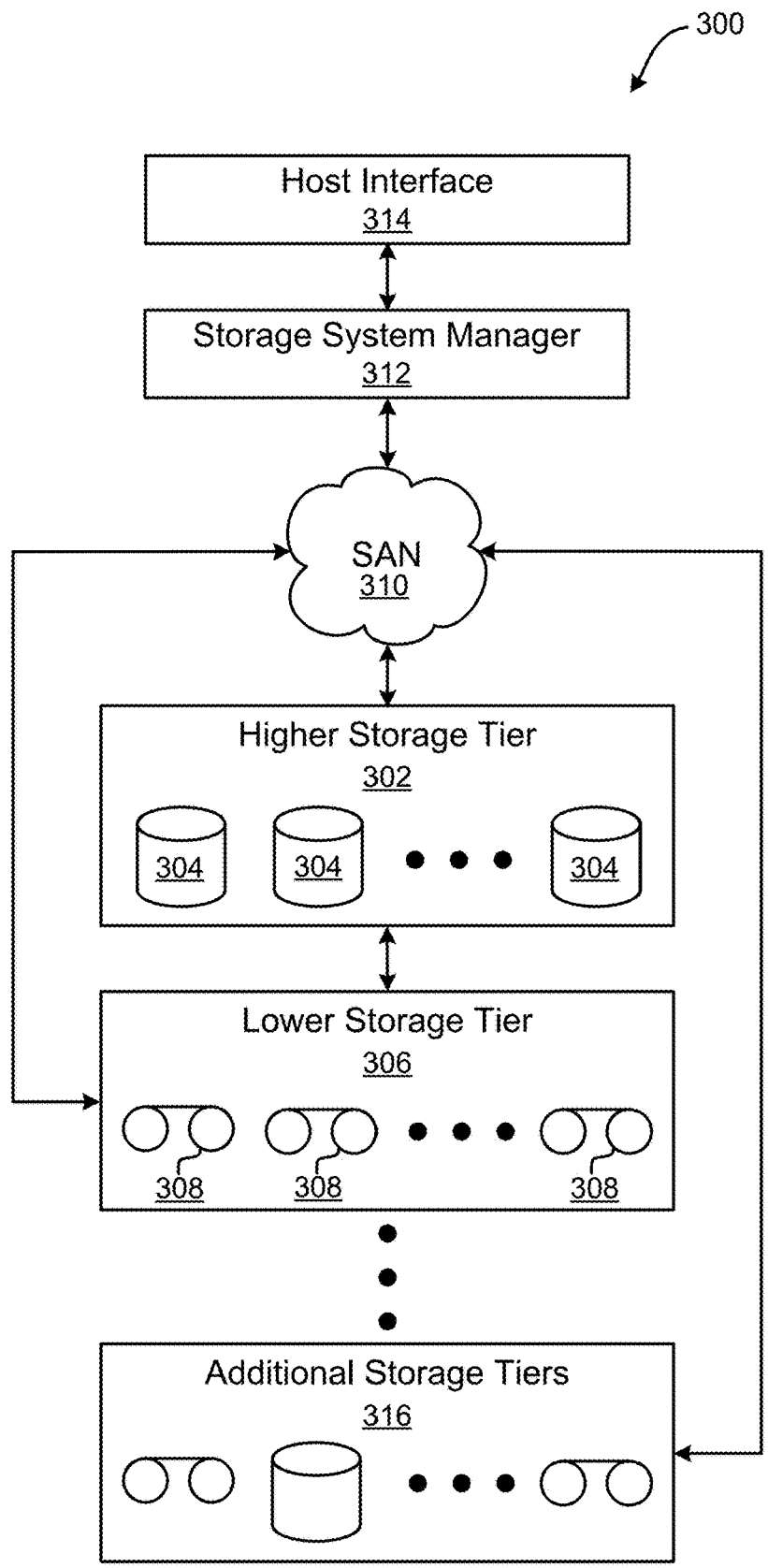
FIG. 3 is diagram of a tiered data storage system, in accordance with one embodiment of the present invention.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media and/or drives on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the drives and/or storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

As previously mentioned elsewhere herein, RAID involves a data storage virtualization technology which combines multiple physical data storage (e.g., memory) components into one or more logical units. Storing data in these logical units involves actually distributing or "striping" the data across the different physical data storage components. In doing so, the one or more logical units are able to improve data redundancy and/or overall performance in comparison to traditional data storage schemes.

Data is distributed across the different physical data storage components in a RAID array using one of several schemes, which are also referred to as "RAID levels". Each of the RAID levels are typically referred to using the word "RAID" followed by a number, such as RAID 0 or RAID 1. Each scheme, or RAID level, provides a different data distribution layout which balances reliability, availability, performance, and capacity in different manners. For example, RAID levels greater than RAID 0 provide protection against unrecoverable sector read errors, as well as against failures of whole physical drives. According to another example, a RAID-1 configuration implements data mirroring which improves data access speeds by utilizing more than one storage device while also providing some data retention. In still other examples, some RAID configurations (e.g., RAID-5, RAID-6, etc.) involve striping data across all storage devices in the array, in addition to reserving one or more units of each data stripe to store parity data which corresponds to the other data in the stripe. The parity data is thereby distributed and/or rotated throughout the array.

Figure 4:
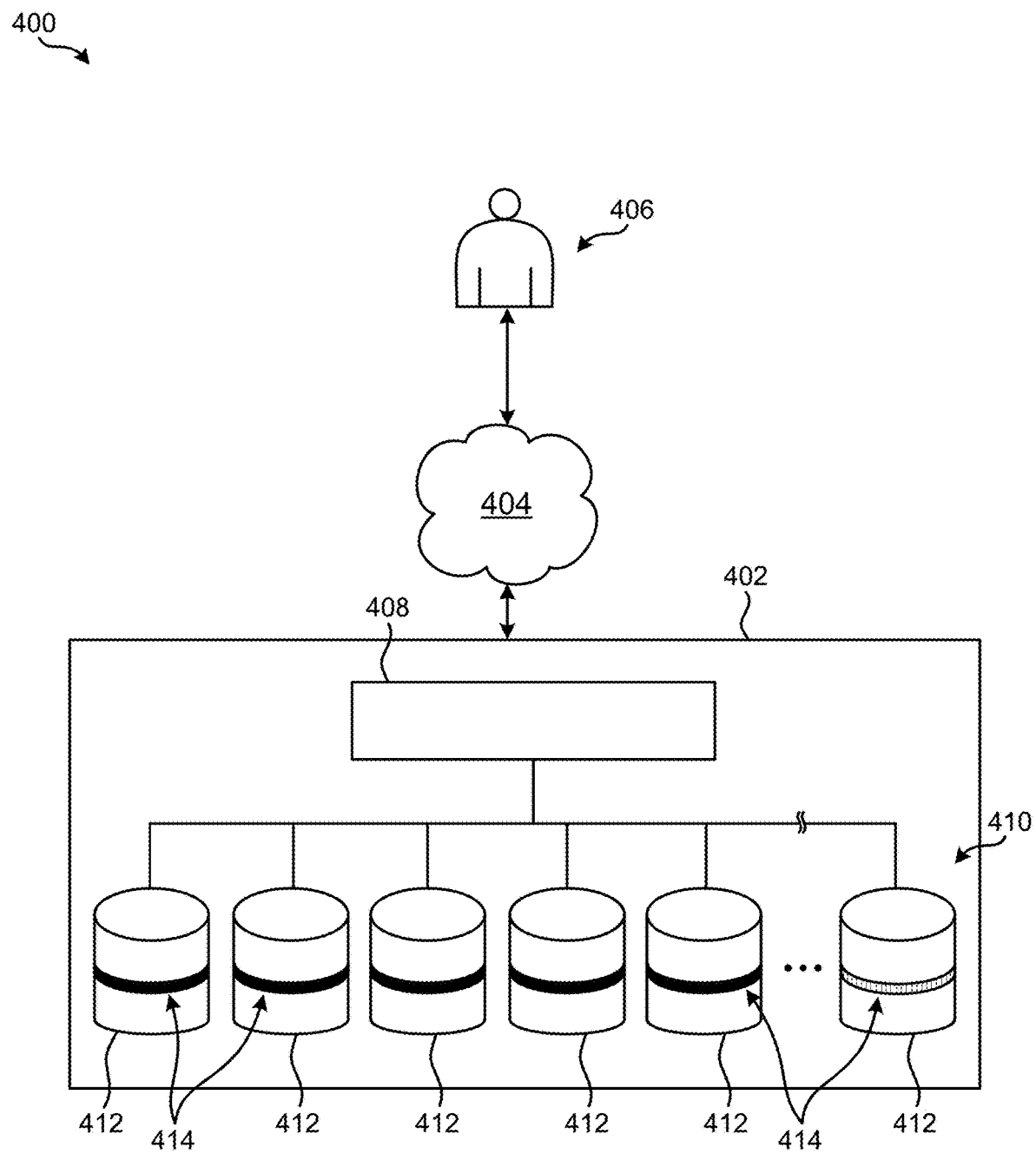
FIG. 4 is a partial representational view of a data storage system, in accordance with one embodiment.

FIG. 4 depicts a data storage system 400 having a RAID configuration implemented therein, in accordance with one approach. As an option, the present data storage system 400 may be implemented in conjunction with features from any other approach listed herein, such as those described with reference to the other FIGS., such as FIGS. 1-3 and 5A-7. However, such data storage system 400 and others presented herein may be used in various applications and/or in permutations which may or may not be specifically described in the illustrative approaches listed herein. Further, the data storage system 400 presented herein may be used in any desired environment. Thus FIG. 4 (and the other FIGS.) may be deemed to include any possible permutation.

As shown, the data storage system 400 includes a storage location 402 which is connected to a network 404. A user device 406 is also connected to the network 404 in the present approach, thereby allowing for the user device 406 to communicate with (e.g., send read requests to, receive data from, write data to, etc.) the storage location 402.

The network 404 may be of any type, e.g., depending on the desired approach. For instance, in some approaches the network 404 is a WAN, e.g., such as the Internet. However, an illustrative list of other network types which network 404 may implement includes, but is not limited to, a LAN, a PSTN, a SAN, an internal telephone network, etc. Accordingly, the on-premise storage location 402 is able to communicate with the remote user device 406 and/or any other entities which may be connected to the network 404 regardless of the amount of separation which exists therebetween, e.g., despite being positioned at different geographical locations.

The storage location 402 further includes a controller 408 which is coupled to a number of different physical storage devices 412. In some approaches, each of the physical storage devices 412 includes the same type of memory. For example, each of the physical storage devices 412 is an HDD in some approaches. However, in other approaches the physical storage devices 412 include more than one different type of memory, e.g., such as HDDs, SSDs, magnetic tape, etc. Each of the physical storage devices 412 may also be able to compress data prior to it being stored in the respective physical storage devices 412. In other words, each of the physical storage devices 412 (e.g., HDDs) is able to perform drive level data compression and/or decompression in some approaches.

Referring still to FIG. 4, the physical storage devices 412 are organized as a logical array 410. In some approaches, the physical storage devices 412 are collectively interpreted by the controller 408 as being a single logical volume of memory. Accordingly, data which is stored in the same logical array 410 may actually be stored on different physical storage devices 412. For instance, an exemplary RAID stripe 414 is shown as extending across all storage devices 412 in the logical array 410. In this example, the logical array 410 serves as a RAID array which spans across more than one of the physical storage devices 412. As mentioned above, the specific RAID configuration implemented also determines how information is actually organized in the RAID stripe 414. For instance, the portion of the RAID stripe 414 located at the right-most storage device 412 (denoted by the crosshatching) is reserved for storing parity data which corresponds to the remainder of the data stored in the RAID stripe 414 in some approaches.

Configurations, such as RAID arrays, typically have a single geometry for their lifecycle. For context, geometry refers to the mapping of array data to drive data, and the role of each drive for data and parity information. However, such a fixed nature of arrays presents an issue for scaling capacity over time. For example, customers conventionally may ongoingly add new arrays of similar size to a RAID data storage system in order to scale capacity while maintaining performance. One technique used to combat such conventional expansion issues includes implementing storage controllers which may allow the capability to expand the geometry unit.

Typically, array expansion is not useful to customers unless allocated data is restriped across a larger RAID set, which may require actively rewriting the data across all drives. Unallocated capacity units may not require a data migration and therefore may be processed relatively much more quickly. In some approaches, an addressable region of an array which, in the process of expansion, has not yet been restriped across a larger RAID set is referred to as an "old geometry addressable region," whereas an addressable region of the array which has, in the process of expansion, been restriped over the larger RAID set may be referred to as a "new geometry addressable region." During the expansion, knowledge of the geometry of both geometry addressable regions may be maintained within the data storage system, in order to enable reading from the old geometry addressable region and writing to the new geometry addressable region. As the expansion progresses, the old geometry addressable region tends to zero size, and the new geometry addressable region may tend to the new size of the array using the larger RAID set.

A system using a log-structured array to manage virtual capacity allocation on demand may write new data into a data stream composed of allocation units and manage references to this data. Upon data being overwritten, the overwritten data is marked as invalid, while the new data is written to a new position in the data stream.

Garbage collection is a process often used in memory management, in which data storage locations currently storing data objects that can no longer be accessed, e.g., data objects that have been deleted by a user and thereafter are considered invalid, are reclaimed. More specifically, during garbage collection, virtual allocation consumed by data marked as invalid is freed via the process of freeing allocation units. An allocation unit may contain a mixture of valid and invalid data. Garbage collection may prioritize allocation units that contain a large percentage of invalid data, as the act of freeing such allocation units has maximum capacity gain. However, in some approaches, garbage collection may, when performed in a RAID data storage system, effectively be counterproductive to performance. For example, in some RAID data storage systems, various conventional techniques for performing garbage collection may be inefficient where invalid data of an old geometry of an array expansion requires data migration to progress the expansion. More specifically, such invalid data in the old geometry may not be garbage collected in time to save the system the resources utilized in the migration.

Various ones of the approaches included herein utilize selective garbage collection to enable efficient/relatively fast expansion of a RAID configuration.

Figure 5A:
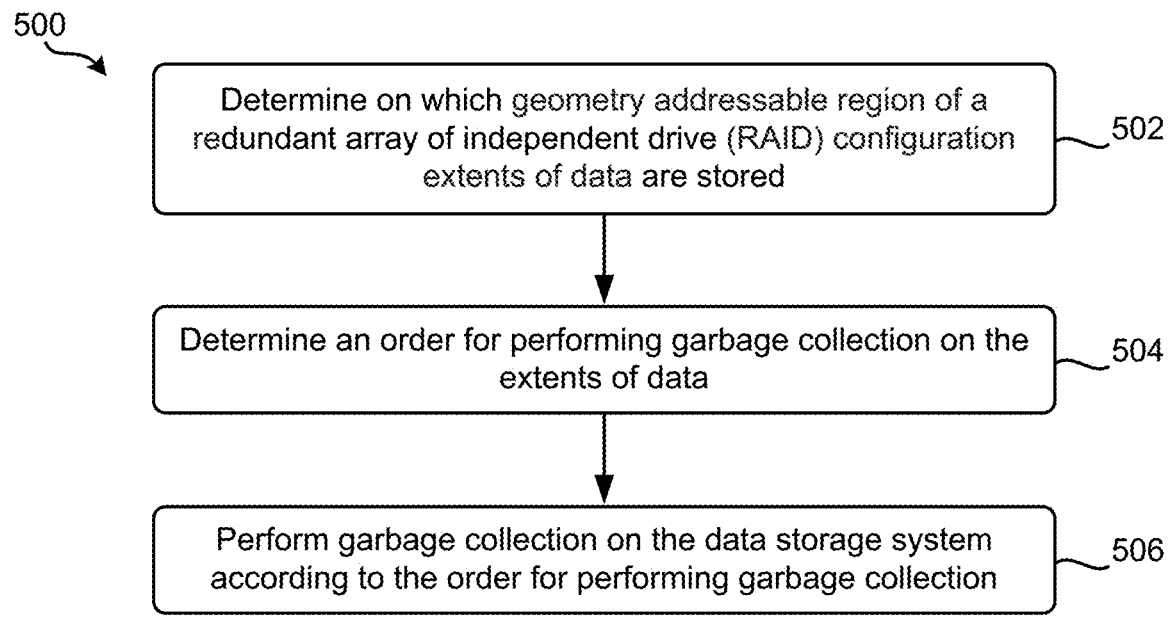
FIG. 5A is a flowchart of a method, in accordance with one embodiment.

Now referring to FIG. 5A, a flowchart of a method 500 is shown according to one embodiment. The method 500 may be performed in accordance with the present invention in any of the environments depicted in FIGS. 1-4, 5B-5C and 6-7, among others, in various embodiments. Of course, more or fewer operations than those specifically described in FIG. 5A may be included in method 500, as would be understood by one of skill in the art upon reading the present descriptions.

Each of the steps of the method 500 may be performed by any suitable component of the operating environment. For example, in various embodiments, the method 500 may be partially or entirely performed by a controller, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

It may be prefaced that various embodiments and/or approaches described herein, e.g., such as one or more of those described with respect to method 500, may include operations performed on a data storage system that includes a RAID configuration. The RAID configuration may include one or more geometry addressable regions. For example, as mentioned elsewhere above, in some approaches, the RAID configuration includes an old geometry addressable region and a new geometry addressable region. An "old geometry addressable region" of the RAID configuration may in some approaches be an addressable region that has not yet been restriped across a relatively larger RAID set, e.g., such as a RAID set that exists during the process of and/or subsequent to expansion of the data storage system from the old geometry addressable region to the new geometry addressable region. In contrast, a "new geometry addressable region" of the RAID configuration may in some approaches be an addressable region which has, in the process of expansion, been restriped over a relatively larger RAID set. In other words, in some approaches, the new geometry addressable region may exist subsequent to restriping occurring over a relatively larger RAID set of the RAID configuration, while the old geometry addressable region may exist prior to restriping occurring over the relatively larger RAID set of the RAID configuration.

Depending on the approach, the old geometry addressable region and the new geometry addressable region may or may not have common drives. For example, in some approaches, the new geometry addressable region may include one or more RAID drives of the old geometry addressable region, e.g., see FIG. 6. In other words, one or more of such approaches may include transitioning from the old geometry addressable region to the new geometry addressable region while retaining at least some hardware, e.g., drives of the old geometry addressable region, to use with the new geometry addressable region. One or more RAID drive of the old geometry addressable region may in some approaches be additionally and/or alternatively excluded from the new geometry addressable region. For example, in one approach, the new geometry addressable region may not include any RAID drives of the old geometry addressable region, e.g., see FIG. 7. In other words, in such an approach, transitioning from the old geometry addressable region to the new geometry addressable region may include phasing out all of the drives of the old geometry and utilizing different RAID drives for the new geometry addressable region.

Operation 502 of method 500 includes determining on which geometry addressable region of the RAID configuration extents of data are stored. According to various approaches, the addressable region of the RAID configuration on which the extents of data are stored may be determined using any one or more known techniques. In some approaches, the geometry addressable region of the RAID configuration on which the extents of data are stored may be determined using a known type of query during expansion of the data storage system from the old geometry addressable region to the new geometry addressable region. As will be described in greater detail elsewhere herein, in some approaches, the entire old geometry addressable region may be in the process of being deleted, while the data is being copied to the new geometry unit. Additionally, in the same way as for expansion within the same set of drives, the old geometry addressable region may be on a different set of drives than the new geometry addressable region. The entire set of data on the deleting volume may be considered "old geometry" and therefore may preferably be garbage collected as a priority.

Performing the query may in some approaches additionally and/or alternatively include accessing one or more known types of information. Various non-limiting examples of such types of information include, e.g., a high watermark, an addressable range, a bitmap, etc.

Operation 504 of method 500 includes determining an order for performing garbage collection on the extents of data.

In some approaches, an order for performing garbage collection on the extents of data may be determined based on the addressable region of the RAID configuration on which the extents of data are stored being determined. The determined order for performing garbage collection on the extents of data may reduce and/or mitigate processing inefficiencies that might otherwise occur as a result of invalid data in an old geometry addressable region being migrated to a new geometry addressable region during transition of the RAID configuration using the new geometry addressable region, e.g., migrated by a restriping occurring over the relatively larger RAID set of the RAID configuration. This is because the invalid data in the old geometry may not be garbage collected in time to save the data storage system the processing expenditure of the migration.

In some preferred approaches, extents of data determined to be stored on the old geometry addressable region are assigned a higher priority within the determined order than extents of data determined to be stored on the new geometry addressable region. This priority scheme may enable a workload reduction as invalid data that exists in the old geometry addressable region is, as a result of being garbage collected, not incorporated into restriping operations performed with respect to the new geometry addressable region. In other words, because invalid data may no longer be needed/accessed in the future, invalid data of the old geometry region is not incorporated into the new geometry addressable region as a result of garbage collection being performed on the old geometry addressable region. Accordingly, the migration of data from partially invalid capacity units is intentionally avoided, thereby resulting in a relatively reduced workload. This relatively reduced workload translates to a preservation of potential processing power, and thereby an efficient RAID configuration expansion process.

It is important to note that assigning extents of data determined to be stored on the old geometry addressable region a higher priority within the order than extents of data determined to be stored on the new geometry addressable region has heretofore not been considered during RAID configuration expansion. This is because at least some extents of data may otherwise include an amount of valid data that would not result in the triggering of garbage collection being performed thereon. In sharp contrast, in various embodiments and/or approaches described herein, a garbage collection priority list may be reordered/determined such that garbage collection work that would otherwise not be attempted due to fullness of valid data in one or more capacity units is chosen as a candidate for work, provided that such work is performed on extents of data that are stored on the old geometry addressable region. Accordingly, the inventive discoveries disclosed herein with regards to selective use of garbage collection during RAID configuration expansion proceed contrary to conventional wisdom.

According to some other approaches, at least some extents of data stored on the new geometry addressable region may be assigned a relatively higher priority in the determined order than a priority of at least some extents of data stored on the old geometry addressable region. This may be because it may be efficient for garbage collection to not be suspended on extents of data stored on the new geometry addressable region simply because the RAID configuration is being expanded. For example, one or more determined orders for performing garbage collection may implement a determined staggered ordering in which extents of data stored on the old geometry addressable region and extents of data stored on the new geometry addressable region are alternated in the order. For purposes of a more specific non-limiting example, a relatively highest priority in the determined order for performing garbage collection may be assigned to an extent of data stored on the old geometry addressable region, a second relatively highest priority in the determined order is assigned to an extent of data stored on the new geometry addressable region, a third relatively highest priority in the determined order is assigned to an extent of data stored on the old geometry addressable region, a fourth relatively highest priority in the determined order is assigned to an extent of data stored on the new geometry addressable region, and so on. One reason for incorporating a staggered ordering may in some approaches be to prevent extents of data that are stored on the new geometry addressable region and have relatively large amounts of invalid data from substantially decreasing capacity of the RAID configuration. For context, the relatively large amounts of invalid data within a given extent of data may be any predetermined amount of data, e.g., 50% or more of invalid data, 90% or more of invalid data, 99% or more of invalid data, etc.

In some approaches weighted scores may be used for determining an order for performing garbage collection on the extents of data. The weighted scores may be assigned to logical block addresses (LBAs) of the extents of data. Such assignments/associations may be stored in a table that is thereafter accessed in order to perform garbage collection.

As will now be described below, looking to FIGS. 5B-5C, exemplary sub-operations of determining an order for performing garbage collection on the extents of data are illustrated in accordance with various embodiments, one or more of which may be used to perform operation 504 of FIG. 5A. However, it should be noted that the sub-operations of FIGS. 5B-5C are illustrated in accordance with various embodiments which is in no way intended to limit the invention.

Figure 5B:
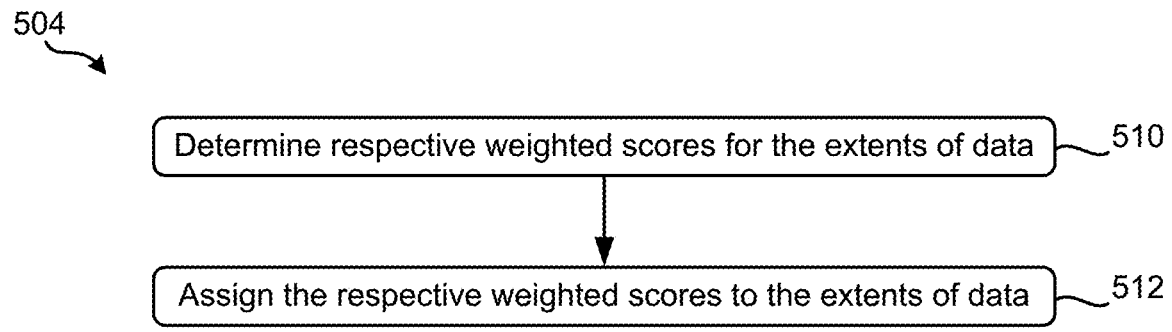
FIG. 5B is a flowchart of a plurality of sub-operations of an operation of the method of FIG. 5A.
Figure 5C:
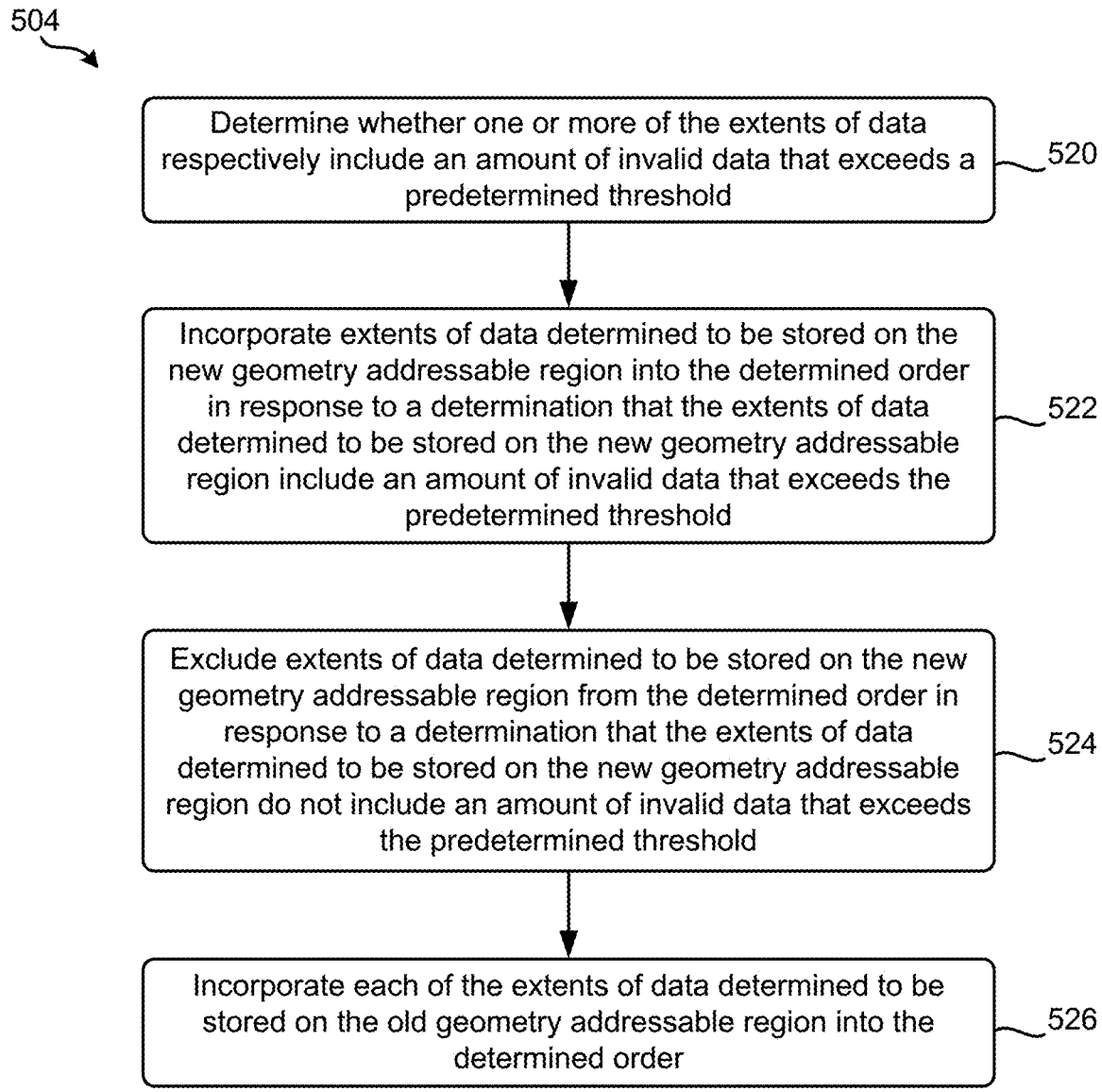
FIG. 5C is a flowchart of a plurality of sub-operations of an operation of the method of FIG. 5A.

Referring first to FIG. 5B, sub-operation 510 includes determining respective weighted scores for the extents of data. The respective weighted scores may be assigned to the extents of data, e.g., see sub-operation 512 of FIG. 5B.

Techniques for determining the respective weighted scores may depend on the approach. In some approaches, extents of data that are to have a higher priority in the determined order for performing garbage collection may be assigned a relatively higher weighted score and extents of data that are to have a lower priority in the determined order for performing garbage collection may be assigned a relatively lower weighted score, e.g., within a predefined range of weighted scores. In contrast, in some other approaches, extents of data that are determined to have a higher priority in the determined order for performing garbage collection may be assigned a relatively lower score and extents of data that are determined to have a lower priority in the determined order for performing garbage collection may be assigned a relatively higher score.

The respective weighted scores may in some other approaches be determined based on amounts of invalid data that the extents of data include. For example, such determinations may include assigning the weighted score of at least some of the extents of data in proportion to the amount of invalid data that the given extent of data includes, e.g., where the extents of data including relatively more invalid data are assigned a weighted score having a relatively greater priority within the determined order for performing garbage collection. In contrast, according to another approach, determinations of one or more of such approaches may additionally and/or alternatively include assigning the weighted score of at least some of the extents of data to be proportional to the amount of valid data that the given extent of data includes, e.g., where the extents of data including relatively less valid data are assigned a weighted score having a relatively higher priority within the determined order for performing garbage collection.

In some other approaches, at least a portion of the weighted scores assigned to the extents of data may be determined based on a known type of random score generator. For example, according to a more specific approach, the weighted scores of extents of data determined to be stored on the old geometry addressable region may be assigned according to one or more of the approaches described elsewhere herein, e.g., such as proportionally according to the amount of valid data included therein. Moreover, in such an approach the weighted scores of extents of data determined to be stored on the new geometry addressable region may be assigned a random weighted score within a predefined range of weighted scores, where the predefined range of weighted scores have a lower priority than the weighted scores assigned to extents of data determined to be stored on the old geometry addressable region.

Further techniques for determining the respective weighted scores for the extents of data may additionally and/or alternatively include, e.g., utilizing one or more weighted scores specified by a user of the RAID configuration, utilizing one or more weighted scores specified by an administrator of the RAID configuration, utilizing one or more weighted scoring determinations that were previously used in a previously performed expansion of the RAID storage system, assigning extents of data determined to have a relatively higher access frequency a weighted score having a relatively greater priority and/or assigning extents of data determined to have a relatively lower access frequency a weighted score having a relatively lower priority, etc.

Referring now to FIG. 5C, according to some approaches, the order for performing garbage collection on the extents of data may additionally and/or alternatively be based on amounts of invalid data that the extents of data include. In some approaches, a predetermined threshold may be utilized in order to control an amount of extents of data that are considered for determining the order for performing garbage collection on the extents of data.

Sub-operation 520 includes determining whether one or more of the extents of data respectively include an amount of invalid data that exceeds a predetermined threshold. Note that any other predetermined condition may be used in other approaches, e.g., matches a predetermined threshold, is below a predetermined threshold, etc. Although sub-operation 520 is described with respect to extents of data respectively including an amount of invalid data, in one or more other approaches, such determinations may additionally and/or alternatively be performed with respect to extents of data respectively including an amount of valid data.

The predetermined threshold may be based on any one or more considerations, and in some approaches may be dynamically adjusted at any time based on such considerations. For example, in some approaches, the predetermined threshold may be based on, e.g., an amount of processing resources currently available in a storage system that includes the RAID configuration, an amount of invalid data determined to exist in the old geometry addressable region and/or the new geometry addressable region, an amount of valid data determined to exist in the old geometry addressable region and/or the new geometry addressable region, an anticipated efficiency of the RAID configuration expansion based on a predetermined number of previously performed garbage collection operations, etc. In some other approaches the predetermined threshold may additionally and/or alternatively be based on a received input, e.g., an input received from a user, an input received from an administrator of the RAID configuration, etc.

Sub-operation 522 includes incorporating extents of data determined to be stored on the new geometry addressable region into the determined order in response to a determination that the extents of data determined to be stored on the new geometry addressable region include an amount of invalid data that exceeds the predetermined threshold. In contrast, in some approaches, extents of data determined to be stored on the new geometry addressable region may be excluded from the determined order in response to a determination that the extents of data determined to be stored on the new geometry addressable region do not include an amount of invalid data that exceeds the predetermined threshold, e.g., see sub-operation 524. Of course, as described elsewhere herein, at least some of the extents, e.g., one of the extents, a majority of the extents, all of the extents, etc., of data determined to be stored on the old geometry addressable region are preferably incorporated into the determined order in some approaches, e.g., see sub-operation 526.

With general reference again to operation 504 of method 500, it should be noted that in some approaches the new geometry addressable region may not include any RAID drives of the old geometry addressable region. Accordingly, at least upon initially transitioning from the old geometry addressable region to the new geometry addressable region, there may be no extents of data stored in the new geometry addressable region. e.g., based on the RAID drives of the new geometry addressable region being recently added to the RAID configuration. In some approaches, in response to a determination that there are no extents of data stored in the new geometry addressable region, the order for performing garbage collection on the extents of data may be determined based only on the extents of data in the old geometry addressable region. Thereafter, in one or more of such approaches, in response to determining that at least one restriping operation has been performed over the relatively larger RAID set of the RAID configuration, e.g., thereby resulting in the new geometry addressable region including at least some extents of data, both the old geometry addressable region and the new geometry addressable region may be considered for determining the order for performing garbage collection on the extents of data. Moreover, in response to determining that at least one restriping operation has been performed over the relatively larger RAID set of the RAID configuration thereby resulting in the new geometry addressable region including at least some extents of data, method 500 may optionally include reevaluating at least some of an already determined order for performing garbage collection on the extents of data.

Operation 506 of method 500 includes performing garbage collection on the data storage system according to the order for performing garbage collection. It should be noted that in some approaches, conventional garbage collection operations may be adapted according to the teachings herein to perform garbage collection. Performing garbage collection according to the determined order preferably frees garbage collected capacity units that have been collected in the old geometry addressable region rather than reusing such units. This ensures that the capacity units remain unused and enables a relatively lower cost of expanding capacity of the RAID configuration. Moreover, new capacity unit allocations in the RAID configuration are preferentially allocated from the new geometry addressable region of the array. Writing data to the old geometry addressable region is preferably avoided (if possible) thereby reducing the costs associated with future expansion processes.

In some approaches the garbage collection may be postponed until it is determined that a capacity resource constraint of the data storage system is, e.g., met, nearing, exceeded, etc. For example, according to some specific approaches, several non-limiting examples of such capacity resource constraints may include, e.g., a predetermined amount of invalid data existing in one or more geometry addressable regions, an amount of data that is to be written to a geometry addressable region being greater than a total storage capacity of available write locations (the garbage collection thereby freeing write locations containing invalid data for writing the data to), a predetermined amount of time occurring since a most previously performed garbage collection operation, etc. Moreover, while garbage collection is being performed, in some preferred approaches in which RAID configuration expansion is ongoing, e.g., expanding from the old geometry addressable region to the new geometry addressable region, garbage collection may be active and run in a state that does not impact host I/O performance, e.g., does not decrease host I/O performance more than a predetermined amount. Accordingly, in some approaches in response to determining that a current state of garbage collection is approaching a predetermined I/O performance threshold and/or approaching a predetermined capacity resource restraint, an amount and/or rate of garbage collection being actively performed may be reduced a predetermined amount. For example, according to various approaches, reducing an amount of garbage collection being performed may include, e.g., at least temporarily suspending garbage collection being performed on extents of data determined to be stored on the old geometry addressable region, at least temporarily suspending garbage collection being performed on extents of data determined to be stored on the new geometry addressable region, at least temporarily suspending garbage collection on a predetermined number of extents of data where the extents of data are proportionally distributed between extents of data determined to be stored on the new geometry addressable region and extents of data determined to be stored on the old geometry addressable region, etc.

Performing garbage collection on the data storage system according to the order for performing garbage collection may in some approaches include performing write operations. For example, in some approaches performing garbage collection on the data storage system according to the order for performing garbage collection may include storing the extents of data determined to be stored on the old geometry addressable region to the new geometry addressable region. Moreover, in some approaches, performing garbage collection on the data storage system according to the order for performing garbage collection may additionally and/or alternatively include not storing the extents of data determined to be stored on the old geometry addressable region to the old geometry addressable region of the data storage system. Accordingly, in such approaches, garbage collection may be performed on extents of data determined to be stored on the old geometry addressable region and rather than rewriting data (determined from the garbage collection process to be valid data) to the old geometry addressable region, the data is instead written in the restriping of the relatively larger RAID set of the RAID configuration, e.g., the new geometry addressable region. Incorporation of valid data into write operations being performed on the new geometry addressable region instead of the old geometry addressable region results in less processing resources being consumed than would otherwise be in writing the valid data to the old geometry addressable region and thereafter rewriting the valid data to the new geometry addressable region during expansion of the RAID configuration. It should be noted however that in some approaches, performing garbage collection in accordance with the determined order may include writing at least some extents of data to the old geometry addressable region.

As indicated elsewhere above (e.g., see one or more approaches of operation 504 of method 500), extents of data determined to be stored on the old geometry addressable region may be assigned a relatively higher priority in the determined order for performing garbage collection than extents of data determined to be stored on the new geometry addressable region. In some approaches, this prioritization of extents of data stored on the old geometry addressable region may be additionally and/or alternatively selectively incorporated during performing garbage collection. For example, in one approach, garbage collection may be performed on extents of data determined to be stored on the new geometry addressable region of the data storage system in response to determining that each of the extents of data determined to include invalid data and be stored on the old geometry addressable region have had garbage collection performed thereon. According to a more general approach, garbage collection may be performed on extents of data determined to be stored on the new geometry addressable region of the data storage system in response to determining that each of the extents of data determined to be stored on the old geometry addressable region have had garbage collection performed thereon.

The determined order for performing garbage collection on the extents of data may be reevaluated and/or redetermined at any time and/or for any reason. Such reevaluation and/or redetermination may in some approaches be performed prior to garbage collections being performed in accordance with the determined order, while in some other approaches may be performed subsequent to initiation of at least some garbage operations in accordance with the determined order. Events/determinations that may result in the determined order being reevaluated/redetermined may depend on the approach and may include, e.g., a write operation being performed on extents of data stored on the old geometry addressable region and/or on extents of data stored on the new geometry addressable region, modification of data pointers that point to data stored on the old geometry addressable region and/or to data stored on the new geometry addressable region, an entry of the determined order being removed from the determined order, an entry being added to the determined order subsequent to the determined order being previously established, a user and/or administrator of the RAID data storage system requesting that the determined order be reevaluated/redetermined, a predefined group of performance metrics of the RAID data storage system decreasing/increasing a predetermined amount, etc.

FIGS. 6-7 depict RAID configurations 600 and 700, in accordance with various approaches. As an option, the present RAID configurations 600 and 700 may be implemented in conjunction with features from any other approach listed herein, such as those described with reference to the other FIGS., such as FIGS. 1-5C. However, such RAID configurations 600 and 700 and others presented herein may be used in various applications and/or in permutations which may or may not be specifically described in the illustrative approaches listed herein. Further, the RAID configurations 600 and 700 presented herein may be used in any desired environment. Thus FIGS. 6-7 (and the other FIGS.) may be deemed to include any possible permutation.

Referring first to FIG. 6, RAID configuration 600 includes a plurality of RAID drives 602. A first plurality 608 of the RAID drives 602 may be determined to be located on an old geometry addressable region 604, while a second plurality 610 of the RAID drives 602 may be determined to be located on a new geometry addressable region 606. In addition to the five RAID drives 602 of the second plurality 610, in the current approach the new geometry addressable region 606 includes three RAID drives 602 of the old geometry addressable region 604. The new geometry addressable region 606 may exist subsequent to restriping occurring over a relatively larger RAID set of the RAID configuration 600, while the old geometry addressable region 604 may exist prior to restriping occurring over the relatively larger RAID set of the RAID configuration 600. Note that in the current configuration, the relatively larger RAID includes the five RAID drives 602 of the second plurality 610 and the three RAID drives 602 of the first plurality 608 in the current configuration.

Referring now to FIG. 7, RAID configuration 700 includes a plurality of RAID drives 702. A first plurality 708 of the RAID drives 702 may be determined to be located on an old geometry addressable region 704, while a second plurality 710 of the RAID drives 702 may be determined to be located on a new geometry addressable region 706. In contrast to RAID configuration 600, it should be noted that in RAID configuration 700, the new geometry addressable region 706 does not include any of the RAID drives 702 of the old geometry addressable region 704. The new geometry addressable region 706 may exist subsequent to restriping occurring over a relatively larger RAID set of the RAID configuration 700, while the old geometry addressable region 704 may exist prior to restriping occurring over the relatively larger RAID set of the RAID configuration 700. Note that in the current approach, the relatively larger RAID includes only the five RAID drives 702 of the new geometry addressable region 706.

Techniques for performing selective use of garbage collection, e.g. such as those described in method 500, may be used to enable relatively efficient and/or quick expansion of RAID configuration 600 and/or RAID configuration 700.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for performing garbage collection in a data storage system having a redundant array of independent drive (RAID) configuration with an old geometry addressable region and a new geometry addressable region, wherein the new geometry addressable region exists subsequent to restriping occurring over a relatively larger RAID set of the RAID configuration, wherein the old geometry addressable region exists prior to restriping occurring over the relatively larger RAID set of the RAID configuration, the method comprising:
   determining on which geometry addressable region of the RAID configuration extents of data are stored;
   determining an order for performing garbage collection on the extents of data, wherein extents of data determined to be stored on the old geometry addressable region are assigned a higher priority within the order than extents of data determined to be stored on the new geometry addressable region; and
   performing garbage collection on the data storage system according to the order for performing garbage collection.

2. The computer-implemented method of claim 1, wherein performing garbage collection on the data storage system according to the order for performing garbage collection includes storing the extents of data determined to be stored on the old geometry addressable region to the new geometry addressable region and not storing the extents of data determined to be stored on the old geometry addressable region to the old geometry addressable region of the data storage system.

3. The computer-implemented method of claim 1, wherein determining on which geometry addressable region of the RAID configuration extents of data are stored includes performing a query during expansion of the data storage system from the old geometry addressable region to the new geometry addressable region, wherein performing the query includes accessing at least one type of information selected from the group consisting of: a high watermark, an addressable range and a bitmap.

4. The computer-implemented method of claim 1, wherein determining the order for performing garbage collection on extents of data includes:
   determining respective weighted scores for the extents of data,
   wherein the respective weighted scores are determined based on amounts of invalid data that the extents of data include; and
   assigning the respective weighted scores to the extents of data.

5. The computer-implemented method of claim 1, wherein determining an order for performing garbage collection on the extents of data includes:
   determining whether one or more of the extents of data respectively include an amount of invalid data that exceeds a predetermined threshold;
   incorporating extents of data determined to be stored on the new geometry addressable region into the determined order in response to a determination that the extents of data determined to be stored on the new geometry addressable region include an amount of invalid data that exceeds the predetermined threshold;
   excluding extents of data determined to be stored on the new geometry addressable region from the determined order in response to a determination that the extents of data determined to be stored on the new geometry addressable region do not include an amount of invalid data that exceeds the predetermined threshold; and
   incorporating each of the extents of data determined to be stored on the old geometry addressable region into the determined order.

6. The computer-implemented method of claim 1, wherein garbage collection is performed on extents of data determined to be stored on the new geometry addressable region of the data storage system in response to determining that each of the extents of data determined to include invalid data and be stored on the old geometry addressable region have had garbage collection performed thereon.

7. The computer-implemented method of claim 1, wherein the new geometry addressable region includes at least one RAID drive of the old geometry addressable region.

8. The computer-implemented method of claim 1, wherein the new geometry addressable region does not include any RAID drives of the old geometry addressable region.

9. A computer program product for performing garbage collection in a data storage system having a redundant array of independent drive (RAID) configuration with an old geometry addressable region and a new geometry addressable region, wherein the new geometry addressable region exists subsequent to restriping occurring over a relatively larger RAID set of the RAID configuration, wherein the old geometry addressable region exists prior to restriping occurring over the relatively larger RAID set of the RAID configuration, the computer program product comprising a computer readable storage medium having program instructions embodied therewith, the program instructions readable and/or executable by a controller to cause the controller to:
 determine, by the controller, on which geometry addressable region of the RAID configuration extents of data are stored;
 determine, by the controller, an order for performing garbage collection on the extents of data, wherein extents of data determined to be stored on the old geometry addressable region are assigned a higher priority within the order than extents of data determined to be stored on the new geometry addressable region; and
 perform, by the controller, garbage collection on the data storage system according to the order for performing garbage collection.

10. The computer program product of claim 9, wherein performing garbage collection on the data storage system according to the order for performing garbage collection includes storing the extents of data determined to be stored on the old geometry addressable region to the new geometry addressable region and not storing the extents of data determined to be stored on the old geometry addressable region to the old geometry addressable region of the data storage system.

11. The computer program product of claim 9, wherein determining on which geometry addressable region of the RAID configuration extents of data are stored includes performing a query during expansion of the data storage system from the old geometry addressable region to the new geometry addressable region, wherein performing the query includes accessing at least one type of information selected from the group consisting of: a high watermark, an addressable range and a bitmap.

12. The computer program product of claim 9, wherein determining the order for performing garbage collection on extents of data includes:
 determining respective weighted scores for the extents of data,
 wherein the respective weighted scores are determined based on amounts of invalid data that the extents of data include; and
 assigning the respective weighted scores to the extents of data.

13. The computer program product of claim 9, wherein determining an order for performing garbage collection on the extents of data includes:
 determining whether one or more of the extents of data respectively include an amount of invalid data that exceeds a predetermined threshold;
 incorporating extents of data determined to be stored on the new geometry addressable region into the determined order in response to a determination that the extents of data determined to be stored on the new geometry addressable region include an amount of invalid data that exceeds the predetermined threshold;
 excluding extents of data determined to be stored on the new geometry addressable region from the determined order in response to a determination that the extents of data determined to be stored on the new geometry addressable region do not include an amount of invalid data that exceeds the predetermined threshold; and
 incorporating each of the extents of data determined to be stored on the old geometry addressable region into the determined order.

14. The computer program product of claim 9, wherein garbage collection is performed on extents of data determined to be stored on the new geometry addressable region of the data storage system in response to determining that each of the extents of data determined to include invalid data and be stored on the old geometry addressable region have had garbage collection performed thereon.

15. The computer program product of claim 9, wherein the new geometry addressable region includes at least one RAID drive of the old geometry addressable region.

16. The computer program product of claim 9, wherein the new geometry addressable region does not include any RAID drives of the old geometry addressable region.

17. A system, comprising:
 a data storage system having a redundant array of independent drive (RAID) configuration with an old geometry addressable region and a new geometry addressable region, wherein the new geometry addressable region exists subsequent restriping occurring over a relatively larger RAID set of the RAID configuration, wherein the old geometry addressable region exists prior to restriping occurring over the relatively larger RAID set of the RAID configuration;
 a processor; and
 logic integrated with the processor, executable by the processor, or integrated with and executable by the processor, the logic being configured to:
 determine on which geometry addressable region of the RAID configuration extents of data are stored;
 determine an order for performing garbage collection on the extents of data, wherein extents of data determined to be stored on the old geometry addressable region are assigned a higher priority within the order than extents of data determined to be stored on the new geometry addressable region; and
 perform garbage collection on the data storage system according to the order for performing garbage collection.

18. The system of claim 17, wherein performing garbage collection on the data storage system according to the order for performing garbage collection includes storing the extents of data determined to be stored on the old geometry addressable region to the new geometry addressable region and not storing the extents of data determined to be stored on the old geometry addressable region to the old geometry addressable region of the data storage system.

19. The system of claim 17, wherein determining on which geometry addressable region of the RAID configuration extents of data are stored includes performing a query during expansion of the data storage system from the old geometry addressable region to the new geometry addressable region, wherein performing the query includes accessing at least one type of information selected from the group consisting of: a high watermark, an addressable range and a bitmap.

20. The system of claim 17, wherein determining the order for performing garbage collection on extents of data includes:
- determining respective weighted scores for the extents of data,
    wherein the respective weighted scores are determined based on amounts of invalid data that the extents of data include; and
- assigning the respective weighted scores to the extents of data.

\* \* \* \* \*